Sept. 8, 1964  C. M. ANTONIO ETAL  3,147,706
PRINTERS' GUM
Filed Aug. 18, 1961
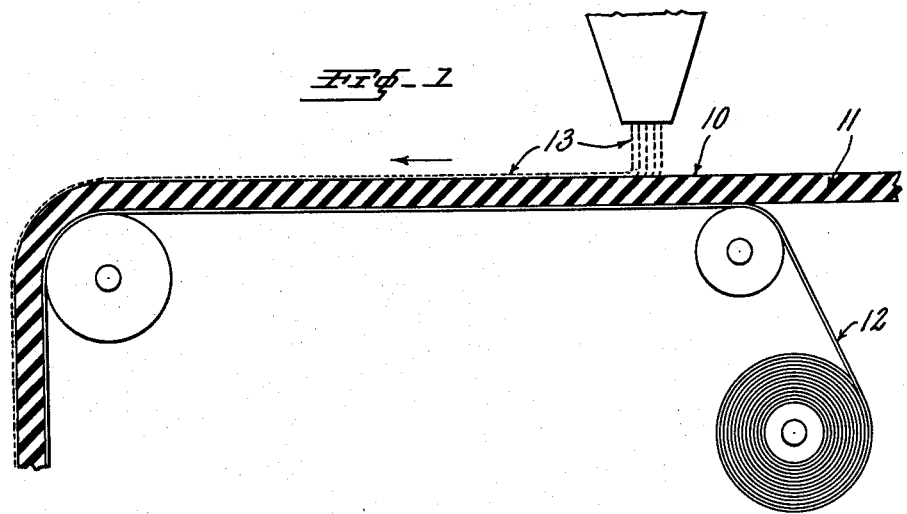
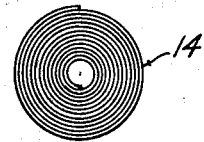
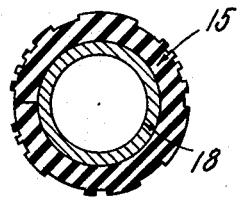
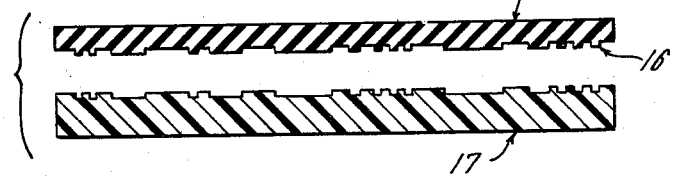
INVENTORS
JAMES J. EAGLESON
CAZEMIRO M. ANTONIO
BY
Salvatore R. Conte
ATTORNEY

3,147,706
PRINTERS' GUM
Cazemiro M. Antonio, West Barrington, and James J. Eagleson, Cranston, R.I., assignors to United States Rubber Company, New York, N.Y., a corporation of New Jersey
Filed Aug. 18, 1961, Ser. No. 132,472
7 Claims. (Cl. 101—401.1)

This invention relates to printing plate materials. More particularly, it relates to unvulcanized elastomeric compositions capable of being fabricated into printing plates having improved characteristics.

The printing plate materials and the printing plates available in accordance with prior art practices have had certain disadvantages. For example, printing plates made from metals or rigid plastics have lacked the flexibility that would be desirable to permit easy mounting of the plates on the cylinders of the printing press. Also, the lack of resiliency, in addition to the hard surface of these materials, sometimes led to cutting or undesirable embossing of delicate surfaces, such as cellophane, glassine, tissue paper, etc., on which it was desired to print.

The disadvantages inherent in metallic or rigid plastic printing plates have been mainly overcome at the present time by the use of printing plates made from materials, known in the printing trade as "printers' gums," which are, generally, calendered or extruded sheets of uncured compositions of rubber or other elastomers. The term, "elastomer," is a generic one for all organic elastic polymers of either natural or synthetic origin and includes natural rubber, synthetic rubber, elastic gum plastics and other rubber-like organic materials. After the sheeted material has been prepared, one side is dusted with a conventional dusting agent to remove surface tack and a suitable liner is laminated to the undusted side. This duplex laminate may then be rolled onto a shell and packed for shipment. At present, the commonly used dusting (anti-tack) agents are finely powdered talcs, cornstarch, whitings, clays, and the like. The liner may consist of holland cloth, polyethylene film, silicone-impregnated release paper, Mylar* polyester film, or any of the special release liners commonly used in the trade for this purpose.

In the preparation of a printing plate, the plate maker simply cuts a section of the sheeted laminate to the required dimensions, strips the liner from the printers' gum, places the dusted side of the latter upon the detailed matrix, and applies heat and pressure to form and vulcanize the printing plate. It is supposed that, in addition to its function as an anti-tack agent, the dusting material prevents the entrapment of air during the molding cycle by providing a means of dispersing or channeling the air, and, in addition, it allows the sheeted printers' gum to move properly during the molding operation, thereby enabling the designs and profiles of the detailed matrix to be suitably filled. The matrix used may be made from any of the materials commonly used in the printing trade for this purpose, for example, a heat hardened synthetic resin, e.g., a phenol-formaldehyde condensation product which is unaffected by temperatures suitable for the vulcanization of rubber and which does not adhere to the molded printing plate.

The molding operation must impart the fine details of the matrix to the sheeted rubber or elastomer composition. In actual practice, however, it has been found that these molding compositions, which have been dusted with talcs, starches, clays, etc., leave a thin drossy film, referred to as "scum," on the printing matrix after molding and fabrication of a printing plate therefrom, thereby requiring that the matrix be suitably cleaned prior to each subsequent molding operation. This objectionable deposit is generally removed by scrubbing the matrix with a copper brush made specifically for this purpose. However, it is virtually impossible to clean all the minute areas and the matrix surface becomes poorer and poorer with progressive usage thereby affecting the sharpness and clarity of the fine details.

Another disadvantage found in these molding compositions that have been treated with the conventional dusting agents is a streakiness or "flow" pattern that occurs on the detailed surface of the molded printing plate. In addition to being commercially objectionable from an appearance standpoint, this streaked pattern produces a difference in ink receptivity, thereby resulting in nonuniformity of ink transfer to the paper, film or object being printed.

Further, although these molding compositions may initially produce a rather shiny, highly glossed surface on the molded printed plate, upon standing at room temperature, the plates tend to lose this glossy appearance, thereby resulting in a dull looking and commercially unattractive product. Ths phenomenon is referred to in the printing trade as "blooming" and is believed to be due to a migration of sulfur, primarily, and other compounding ingredients in the elastomeric composition to the surface of the molded printing plate after a period of time. As can be expected, a "bloomed" printing plate does not permit a constant uniformity in ink receptivity and transfer, particularly when the printing of fine detail with accuracy is required.

The present invention has for its principal object the overcoming of the foregoing difficulties by provision of a printing plate material which the ordinary plate maker can utilize conveniently and efficiently.

Another object is the provision of unvulcanized elastomeric compositions, capable of being fabricated into a printing plate when heated to softening and curing temperatures under pressure in contact with a detailed printing matrix.

A further object is the elimination of scumming of the matrix mold when said unvulcanized elastomeric compositions are molded into printing plates.

Still another object is the elimination of objectionable streakiness occurring in the molded printed plate as well as any blooming thereof.

An even further object is to provide unvulcanized elastomeric compositions for making printing plates having improved ink receptivity and transferring qualities.

Other objects and a fuller understanding of the invention may be had by referring to the following description and claims, taken in conjunction with the accompanying drawings.

In the accompanying drawings:

FIGURE 1 is a transverse sectional view illustrating the making of a sheet of printing plate material made in accordance with this invention;

FIGURE 2 is an end view on a smaller scale of the printing plate material rolled up for shipment or storage;

FIGURE 3 is a transverse sectional view of a printing plate and matrix; and

FIGURE 4 is a transverse sectional view of the printing plate applied to the cylinder of a printing press.

Our invention comprises a sheeted unvulcanized elastomeric composition dusted with a finely powdered thermoplastic resin on the surface coming in contact with a detailed matrix during fabrication of the elastomeric composition into a printing plate. We have discovered that the substitution of powdered thermoplastic resins for the conventional dusting agents, such as talc, starch, whiting, clay, etc., results in a printing plate possessing outstanding visual and printing characteristics.

Referring to the drawings, and in particular to FIG. 1, there is shown a laminated sheet of printing plate material 10 consisting of a resilient sheet of relatively soft rubber ---
*Trademark for film of polyethylene terephthalate marketed by E. I. du Pont de Nemours & Co.

11 in the unvulcanized state with a suitable release liner 12 adhered to one surface thereof and dusted, on the other surface, with a finely powdered thermoplastic resin 13. Typical of the thermoplastic resins suitable for use in this invention are those which melt at 350° F. or lower, for example, chlorinated rubber, polyvinyl resins, such as polyvinyl chloride and vinyl acetate-vinyl chloride copolymers, acrylic resins such as polyacrylate, polymethacrylate and polymethyl methacrylate, cellulosic resins such as cellulose acetate, cellulose acetate butyrate, and cellulose proprionate, coumarone-indene resins, nylon resins such as hexamethyleneadipamide polymer and polycaprolactam, polyethylene, polypropylene and polystyrene. Among these, we have found chlorinated rubber and polyvinyl chloride to be preferred.

For the preparation of a suitable printing plate material, the elastomeric printers' gum composition should be so compounded, in a manner that will be understood by those skilled in the art of rubber compounding, as to be vulcanizable, at the usual molding temperatures, to a vulcanized state, such that the vulcanized material has a Shore hardness within the range from 15 to 90 on the Shore A scale.

The preferred elastomers suitable for use in this invention are (1) natural rubber; (2) nitrile rubbers, which are copolymers of butadiene and acrylonitrile, the ratio of butadiene to acrylonitrile being from about 85% to 50% by weight of butadiene to 15% to 50% of acrylonitrile; (3) butyl rubber, which comprises the rubbery copolymers made by copolymerizing an isoolefin, usually isobutylene, with a minor proportion of a conjugated diolefin containing from 4 to 8 carbon atoms such as isoprene, butadiene, piperylene, etc., in proportions varying from 90 to 99.5 parts by weight of isoolefin and correspondingly 10 to 0.5 parts of diolefin, and preferably, from 95 to 99.5 parts of isoolefin and correspondingly 5 to 0.5 parts of diolefin; and (4) SBR rubber, which comprises the rubbery copolymers made from butadiene and styrene. Typical recipes of the aforementioned elastomers in molding compositions suitable for fabrication into printing plates are shown in Table I.

TABLE I

| Materials | Parts By Weight | | | |
|---|---|---|---|---|
| | A | B | C | D |
| Nitrile rubber | 100.00 | | | |
| Natural rubber | | 100.00 | | |
| Butyl rubber | | | 100.00 | |
| SBR rubber | | | | 100.00 |
| Zinc oxide | 5.00 | 75.00 | 5.00 | 3.50 |
| Carbon black | 50.00 | | 45.00 | |
| Clay | | 25.00 | | 45.00 |
| Red iron oxide | | 8.00 | | 5.00 |
| Titanium oxide | | | 9.00 | |
| Plasticizer | 62.50 | 5.00 | 3.00 | 30.00 |
| Antioxidant | 1.00 | 0.75 | | 3.00 |
| Stearic acid | 0.50 | 1.00 | 2.00 | 1.25 |
| Accelerator | 1.50 | 1.00 | 1.60 | 0.50 |
| Sulfur | 1.60 | 3.00 | 1.75 | 2.25 |
| Shore A hardness of cured plate | 30 | 50 | 45 | 50 |

For the purposes of this invention, we have found that a suitable particle size for the powdered thermoplastic resins is from 5 to 25 microns, and, for best results, the resin should be dusted onto the sheeted rubber so as to form a uniform, continuous layer when fused. Theoretically, the thickness of the powdered unfused resin layer is equal to the particle size of the resin employed, but, in actual practice, the depth of the layer that is generally utilized is of that thickness resulting from the natural adherence of the resinous dust to the surface of the rubber due to the inherent tackiness of the unvulcanized rubber.

The following examples will illustrate the invention in further detail.

*Example 1*

The formulation designated by the letter A in Table I, wherein the nitrile rubber had a butadieneacrylonitrile content of 72% butadiene and 28% acrylonitrile, was mixed on a roll mill, calendered into sheets having a thickness of 0.125 inch and laminated with holland cloth on one of its surfaces. The other surface was dusted with finely powdered polyvinyl chloride resin, having a particle size of 7–15 microns and marketed under the trademark Marvinol VR–10 by Naugatuck Chemical Division of United States Rubber Company. In this case, the polyvinyl chloride resin was suitably placed on the calendered sheet using a rotary brush to properly disperse the dust into a continuous layer throughout, although any of the various types of conventional dusting equipment may be used. The depth of the powdered resinous layer was of that thickness which normally adhered to the surface of the sheeted rubber as a result of the inherent tackiness of the rubber. The dusted, sheeted material was flexible and could easily be rolled up into a roll 14, as shown in FIG. 2, for storage or shipping.

To prepare a printing plate from this sheeted material, a piece was simply cut from the roll 14 to the size of the printing matrix, the holland cloth liner 12 stripped off, and the sheeted unvulcanized printers' gum placed on top of the matrix with its dusted surface in contact with the matrix. The assembly was placed between the platens of a vulcanizing press between thickness bearers to control the thickness of the finished plate. The press was closed to effect a preliminary dwell, during which the material of the plate was pre-heated by contact with the platens, but without being actually compressed. After one minute of such dwell, a platen pressure of about 125 pounds per square inch was applied for about 8 minutes at 307° F. during which time the plate material became completely cured and had a Shore A hardness of 30. The cured printing plate 15, illustrated in FIG. 3, with the printing impressions 16 molded in its face, was removed from the matrix 17 and the flash trimmed off. The printing plate thus obtained comprises an elastomeric body, a thin coating of thermoplastic resin on a surface of said body, said body being adhered to said coating, and said body and coating having printing details impressed therein during vulcanization, the depth of said details being greater than the thickness of said coating. The plate was then ready for mounting onto a cylindrical roll 18 of a press as shown in FIG. 4. Because of the flexible nature of the vulcanized plate, there is no difficulty encountered in conforming the plate to the curvature of the plate cylinder. It was found by actual use of the plate that the surface was capable of printing fine detail with accuracy even after prolonged periods of use.

For control purposes, a second sample was similarly fabricated into a printing plate except that one of the conventional dusting materials, to wit, micronized talc, was used to dust the surface of the unvulcanized elastomeric sheet prior to molding instead of polyvinyl chloride resin.

It was found that the control sample, which had been dusted with micronized talc, left a thin scum deposit on the surface of the printing matrix, which required that the matrix be thoroughly cleaned before a subsequent molding operation. In addition, the molded surface of the printing plate possessed a drab, streaked appearance. In contrast, the sample that had been dusted with polyvinyl chloride left no scum on the printing matrix and the cured printing plate possessed a highly glossed, non-streaked surface. In addition, after several days, the surface of the control sample started to shown signs of "blooming," whereas the printing plate made in accordance with this invention maintained its original, highly glossed, non-streaked appearance, and continued to do so even after many months.

Example 2

Following the procedure outlined in Example 1, a printing plate with a Shore A hardness of 50 was prepared from the formulation designated by the letter B in Table I, the natural rubber consisting of No. 1 Smoked Sheets. In this instance, however, the unvulcanized sample was dusted with chlorinated rubber, marketed under the trademark Parlon 20 by the Hercules Powder Company, prior to contact with the printing matrix and subsequent fabrication into a printing plate. The chlorinated rubber had been previously reduced to a particle size of 10–25 microns. As a control, a second sample was similarly made into a printing plate, except that its surface was dusted with cornstarch instead of chlorinated rubber.

A visual comparison of the resulting molded plates showed a marked difference in their surfaces. The printing plate which has been prepared from the sample dusted with cornstarch was not lustrous and possessed badly streaked areas. In contrast, the surface of the printing plate made from the sample dusted with chlorinated rubber was extremely and uniformly glossed, and non-streaked. It was also found that the control plate started to "bloom" after several days, whereas the printing plate prepared in accordance with our invention continued to maintain its original glossey surface even after many months. In addition, after molding, the control sample left a thin scum layer on the matrix surface, whereas the sample dusted with chlorinated rubber left a clean matrix which was ready for the next molding operation without further cleansing or preparation thereof.

From the drawings and the above description, it is seen that the present invention has provided improved molding compositions for the preparation of printing plates having a coating of thermoplastic resin on the printing surface, said coating being thin in compariosn to the depth of the printing details. The use of finely powdered thermoplastic resins as dusting agents for unvulcanized printers' gums prior to contact with a printing matrix and subsequent vulcanization into a printing plate has resulted in the overcoming of many disadvantages heretofore existing in the printing trade. For example, according to our invention, "scumming" of the printing matrix after a molding operation has been eliminated, the matrix being ready for the next molding cycle with no cleansing or brushing thereof required. The useful life of the matrix is, therefore, greately extended.

In addition, a commercially attractive, highly glossed finish, free of "bloomed" or streaked areas, is obtained on the surface of the molded plates prepared in accordance with this invention, the plates retaining this exceptionally glossy surface even after prolonged periods of time. The elimination of surface streakiness permits a constant uniformity in the ink receptivity of the printing plate. In turn, this improvement in ink receptivity results in an improvement in the transfer of ink to the paper, film or object being printed, which is particularly important when the printing of fine detail with accuracy is required. The improvements in ink receptivity and ink transfer also provide an added benefit in that less ink is necessary to obtain the same density of print than is required with the use of printing plates made from molding compositions that had been dusted with the conventional dusting agents.

A preferred form of the invention has been described above but it is not intended to exclude modifications thereof. For example, the function of the release liners, which are laminated to one surface of the unvulcanized sheeting of molding composition, is mainly for the advantageous packaging and handling of the latter material, and is not of importance, per se, to the molding operation of a printing plate. In addition, it is within the realm of this invention that, rather than dust the surface of the unvulcanized printers' gum prior to contact with the printing matrix, one could pre-dust the surface of the matrix instead. The use of the present thermoplastic resins in the form of a thin film interposed between the matrix and the sheeted unvulcanized elastomeric composition prior to molding is also contemplated.

Having thus described our invention, what we claim and desire to protect by Letters Patent is:

1. A sheeted unvulcanized elastomeric composition capable of being fabricated into a printing plate when heated to softening and curing temperatures under pressure in contact with a matrix, the contacting surface of said composition having a layer of thermoplastic resinous dust thereon, the thickness of said layer being equal to the natural adherence of said resinous dust to said contacting surface due to the inherent tackiness of the unvulcanized elastomeric composition.

2. The composition of claim 1 wherein the thermoplastic resinous dust is finely powdered polyvinyl chloride.

3. The composition of claim 1 wherein the thermoplastic resinous dust is finely powdered chlorinated rubber.

4. A method of producing a printing plate comprising forming a sheet of vulcanizable rubber, dusting a surface of said sheet with a finely powdered thermoplastic resin to form a layer having that thickness resulting from the natural adherence of the powdered resin to the surface of said sheet due to the inherent tackiness of said vulcanizable rubber, laying said sheet in molding position with the dusted surface toward a matrix, and molding a printing surface on said sheet by subjecting the assembled parts to curing temperature and pressure.

5. The method of claim 4 wherein said thermoplastic resin is polyvinyl chloride.

6. The method of claim 4 wherein said thermoplastic resin is chlorinated rubber.

7. The method of claim 4 wherein the particle size of said thermoplastic resin is from 5 to 25 microns.

References Cited in the file of this patent

UNITED STATES PATENTS

| | | |
|---|---|---|
| 2,028,712 | Swan et al. | Jan. 21, 1936 |
| 2,647,864 | Goffredo | Aug. 4, 1953 |
| 2,673,844 | Gilcrease | Mar. 30, 1954 |